(12) United States Patent
Matsui et al.

(10) Patent No.: US 8,363,248 B2
(45) Date of Patent: Jan. 29, 2013

(54) IMAGE FORMING APPARATUS

(75) Inventors: Hideaki Matsui, Kanagawa (JP);
Takeshi Fujita, Tokyo (JP); Kazuma Saitoh, Tokyo (JP); Daisuke Okada, Saitama (JP)

(73) Assignee: Ricoh Company, Limited, Tokyo (JP)

( * ) Notice: Subject to any disclaimer, the term of this patent is extended or adjusted under 35 U.S.C. 154(b) by 1288 days.

(21) Appl. No.: 12/124,527

(22) Filed: May 21, 2008

(65) Prior Publication Data

US 2008/0297838 A1 Dec. 4, 2008

(30) Foreign Application Priority Data

May 31, 2007 (JP) ................................. 2007-146090

(51) Int. Cl.
*G06F 3/12* (2006.01)
(52) U.S. Cl. ....... 358/1.15; 358/1.9; 358/1.16; 358/1.18
(58) Field of Classification Search ................... 358/1.9, 358/1.15, 1.16, 1.18
See application file for complete search history.

(56) References Cited

U.S. PATENT DOCUMENTS

| | | | |
|---|---|---|---|
| 5,761,395 A * | 6/1998 | Miyazaki et al. ............ | 358/1.11 |
| 6,515,756 B1 | 2/2003 | Mastie et al. | |
| 6,614,549 B1 * | 9/2003 | Hlava ........................... | 358/1.15 |
| 2005/0259277 A1 | 11/2005 | Ferlitsch | |
| 2006/0050294 A1 * | 3/2006 | Smith et al. .................. | 358/1.15 |

FOREIGN PATENT DOCUMENTS

| | | |
|---|---|---|
| JP | 2003-44242 | 2/2003 |
| JP | 2003-167709 | 6/2003 |
| JP | 2006-350437 | 12/2006 |

OTHER PUBLICATIONS

Office Action issued Jun. 7, 2011 in Japanese Patent Application No. 2007-146090.

* cited by examiner

*Primary Examiner* — Vu Hang
(74) *Attorney, Agent, or Firm* — Oblon, Spivak, McClelland, Maier & Neustadt, L.L.P.

(57) ABSTRACT

An image forming apparatus includes a setting-information storage unit that stores plural pieces of print setting information each indicating a list of settings on printing, in association with logical printer names, a data receiving unit that receives PJL data, print drawing data, and a logical printer name from a client terminal, a parameter setting unit that compares settings included in the received PJL data and the settings in the print setting information that is stored in the setting-information storage unit and corresponds to the received logical printer name, to specify the settings included in the PJL data as print parameters, and a printing unit that prints the print drawing data using the specified print parameters.

4 Claims, 12 Drawing Sheets

FIG. 2

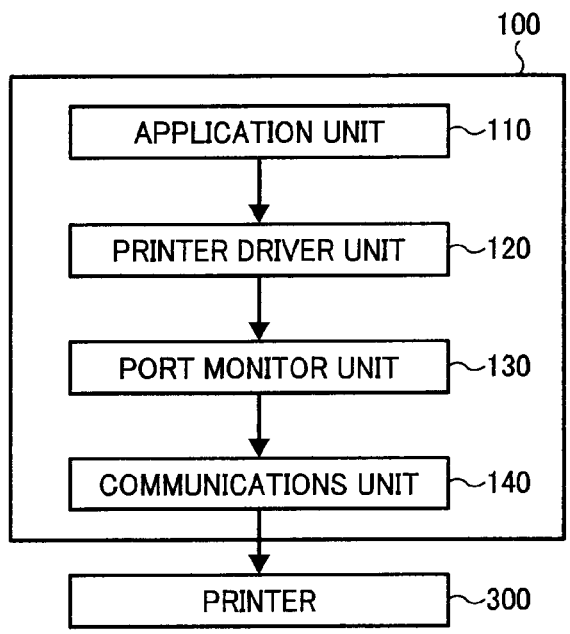

FIG. 3

```
<ESC>%-12345X@PJL JOB NAME = "Microsoft Word - sample.doc"
    @PJL SET JOBOFFSET = OFF
    @PJL SET QTY = 1
    @PJL SET DUPLEX = ON
    @PJL SET BINDING = LEFT
    @PJL SET STAPLE = LEFTTOP
    @PJL SET PUNCH = OFF
    @PJL SET TRAY = TRAY1
    @PJL SET MEDIATYPE = PLAIN
    @PJL SET OUTBIN = FINISHERSHIFT
    @PJL SET ECONOMODE = OFF
    @PJL SET SMOOTHING = OFF
              ⋮
@PJL ENTER LANGUAGE = PCL
    @PJL EOJ NAME = "Microsoft Word sample.doc"
<ESC>%-12345X
```

FIG. 5

SETTING LIST FOR LOGICAL PRINTER 0
(PR0.lst)
420

| SETTING ITEM | SETTING VALUE |
|---|---|
| NUMBER OF COPIES (QTY) | 999 |
| FEED TRAY (TRAY) | TRAY 2 |
| MEDIA TYPE (MEDIATYPE) | RECYCLED PAPER |
| DUPLEXING (DUPLEX) | FLIP ON SHORT EDGE |
| OUTPUT BIN (OUTBIN) | FINISHER SHIFT TRAY |
| STAPLING (STAPLE) | TOP LEFT |
| PUNCHING (PUNCH) | TOP |
| JOB OFFSET (JOBOFFSET) | YES |
| TONER SAVING (ECONOMODE) | YES |
| SMOOTHING (SMOOTHING) | YES |

SETTING LIST FOR LOGICAL PRINTER 2
(PR2.lst)
410

| SETTING ITEM | SETTING VALUE |
|---|---|
| NUMBER OF COPIES (QTY) | 1 |
| FEED TRAY (TRAY) | TRAY 1 |
| MEDIA TYPE (MEDIATYPE) | STANDARD PAPER |
| DUPLEXING (DUPLEX) | FLIP ON LONG EDGE |
| OUTPUT BIN (OUTBIN) | MAIN BODY TRAY |
| STAPLING (STAPLE) | NO |
| PUNCHING (PUNCH) | NO |
| JOB OFFSET (JOBOFFSET) | NO |
| TONER SAVING (ECONOMODE) | NO |
| SMOOTHING (SMOOTHING) | NO |

SETTING LIST FOR LOGICAL PRINTER 1
(PR1.lst)
400

| SETTING ITEM | SETTING VALUE |
|---|---|
| NUMBER OF COPIES (QTY) | 1 |
| FEED TRAY (TRAY) | AUTOMATIC SELECTION |
| MEDIA TYPE (MEDIATYPE) | STANDARD PAPER |
| DUPLEXING (DUPLEX) | NO |
| OUTPUT BIN (OUTBIN) | MAIN BODY TRAY |
| STAPLING (STAPLE) | NO |
| PUNCHING (PUNCH) | NO |
| JOB OFFSET (JOBOFFSET) | NO |
| TONER SAVING (ECONOMODE) | NO |
| SMOOTHING (SMOOTHING) | NO |

FIG. 6

▶ INPUT SETTING VALUE FOR LOGICAL PRINTER

| SETTING ITEM | SETTING VALUE |
|---|---|
| NUMBER OF COPIES (QTY) | |
| FEED TRAY (TRAY) | |
| MEDIA TYPE (MEDIATYPE) | |
| DUPLEXING (DUPLEX) | |
| OUTPUT BIN (OUTBIN) | |
| STAPLING (STAPLE) | |
| PUNCHING (PUNCH) | |
| JOB OFFSET (JOBOFFSET) | |
| TONER SAVING (ECONOMODE) | |
| SMOOTHING (SMOOTHING) | |

FIG. 11

SETTING LIST WITH PRIORITY
FOR LOGICAL PRINTER 1
(PR1.lst)                                  4000

| SETTING ITEM | SETTING VALUE | PRIORITY |
|---|---|---|
| NUMBER OF COPIES (QTY) | 1 | 1 |
| FEED TRAY (TRAY) | TRAY 1 | 7 |
| MEDIA TYPE (MEDIATYPE) | STANDARD PAPER | 8 |
| DUPLEXING (DUPLEX) | FLIP ON LONG EDGE | 2 |
| OUTPUT BIN (OUTBIN) | MAIN BODY TRAY | 3 |
| STAPLING (STAPLE) | NO | 9 |
| PUNCHING (PUNCH) | NO | 10 |
| JOB OFFSET (JOBOFFSET) | NO | 4 |
| TONER SAVING (ECONOMODE) | NO | 5 |
| SMOOTHING (SMOOTHING) | NO | 6 |

FIG. 12

<ESC>%-12345X@PJL JOB NAME = "Microsoft Word - sample.doc"

```
@PJL SET JOBOFFSET = OFF
@PJL SET QTY = 1
@PJL SET DUPLEX = ON
@PJL SET BINDING = RIGHT
@PJL SET STAPLE = RIGHTTOP
@PJL SET PUNCH = TOP
@PJL SET TRAY = TRAY1
@PJL SET MEDIATYPE = PLAIN
@PJL SET OUTBIN = FINISHERSHIFT
@PJL SET ECONOMODE = OFF
@PJL SET SMOOTHING = OFF
```

⋮

@PJL ENTER LANGUAGE = PCL
    @PJL EOJ NAME = "Microsoft Word sample.doc"
<ESC>%-12345X

IMAGE FORMING APPARATUS

CROSS-REFERENCE TO RELATED APPLICATIONS

The present application claims priority to and incorporates by reference the entire contents of Japanese priority document 2007-146090 filed in Japan on May 31, 2007.

BACKGROUND OF THE INVENTION

1. Field of the Invention

The present invention relates to an image forming apparatus that prints drawing data.

2. Description of the Related Art

When drawing data, such as documents, are to be printed with a printer according to an instruction from a computer device, a technique as mentioned below is typically used. Print setting information such as the number of copies and the paper size is previously set in a virtual printer (logical printer) different from a physical printer, and the drawing data is printed according to the set print setting information. A logical printer means a virtual printer that is set to be referred to by an operating system (OS) according to the print setting information.

According to the technique as mentioned above, when the computer device and the printer are in a network environment, the print setting information for the logical printer is usually stored in a server called "printer server".

For example, in the technology disclosed in Japanese Patent Application Laid-open No. 2003-167709, when the name of a logical printer that is to print drawing data according to an operation of a user, the drawing data, and print setting information such as number of copies and a paper size are specified through a computer device (client terminal), the printer server receives these data. The printer server temporarily stores the received data and prints the drawing data according to the stored print setting information.

In the technique described in the Japanese Patent Application Laid-open No. 2003-167709, however, the printer server is indispensable because the print setting information for the logical printer is stored in the printer server. Consequently, processing becomes complicated, and considerable time is required to complete the printing. Investments for installation of the printer server are additionally required, which increases personnel and material costs.

SUMMARY OF THE INVENTION

It is an object of the present invention to at least partially solve the problems in the conventional technology.

According to an aspect of the present invention, there is provided an image forming apparatus including a setting-information storage unit that stores therein plural pieces of first print setting information each indicating a list of settings on printing in association with first setting identification information specific to the print setting information; a data receiving unit that receives second print setting data including settings on printing, specified by a user through an information processing terminal that is connected to a network, print drawing data including drawing data to be printed, and second setting identification information, as a print request; a parameter setting unit that compares the settings included in the print setting data and settings included in third print setting information that is the first print setting information that corresponds to the second setting identification information, and when the both settings do not coincide, specifies the settings included in the print setting data as print parameters; and a printing unit that prints the print drawing data using the print parameters.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a block diagram of a configuration of a client terminal shown in FIG. 1;

FIG. 3 is an example of printer job language (PJL) data generated by the client terminal shown in FIG. 2;

FIG. 5 is an example of setting lists stored in a setting-list-information storage unit shown in FIG. 4;

FIG. 6 is an example of a screen for inputting setting values in the setting list through a setting client terminal shown in FIG. 1;

FIG. 11 is an example of a setting list stored in a setting-list-information storage unit shown in FIG. 10;

FIG. 12 is an example of PJL data generated by a client terminal according to the second embodiment.

DETAILED DESCRIPTION OF THE PREFERRED EMBODIMENTS

Exemplary embodiments of an image forming apparatus according to the present invention will be explained below in detail with reference to the accompanying drawings.

An example in which an image forming apparatus according to an embodiment of the present invention is applied to a printer 300, which is a printing machine such as a color printer, is explained. The present embodiment can be applied not only to a dedicated apparatus for printing like the printer 300, but also to any apparatus with a printing function, such as a multi function peripheral (MFP) having a copying function, a facsimile (FAX) function, a printing function, a scanning function, and the like in one housing.

Figure 1:
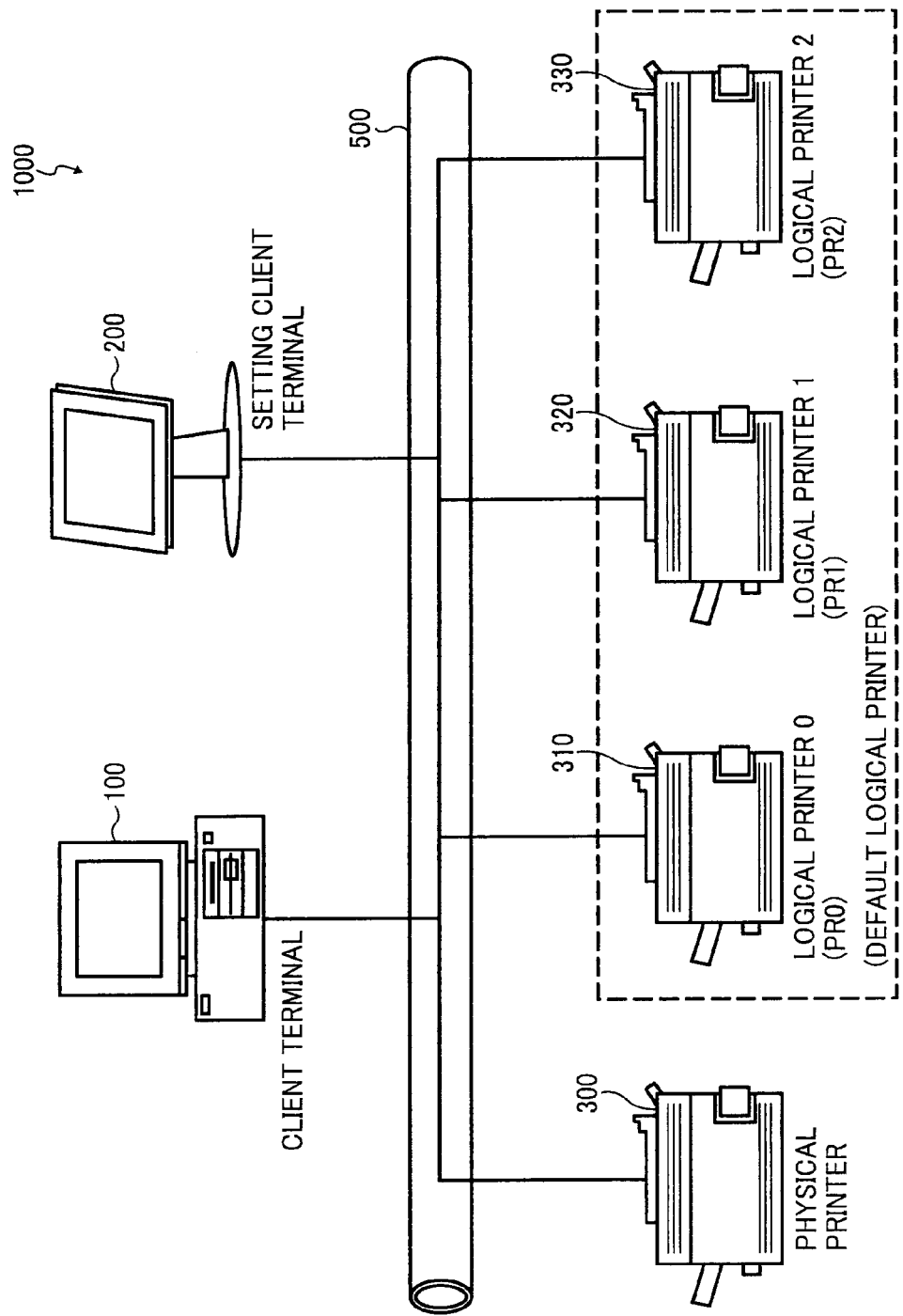
FIG. 1 depicts a configuration of a printer system according to a first embodiment of the present invention.

FIG. 1 depicts a network configuration of a printer system 1000 including the printer 300 according to a first embodiment of the present invention. As shown in FIG. 1, the printer system 1000 includes a client terminal 100, a setting client terminal 200, and the printer 300, which are connected via a network 500. Logical printers 310, 320, and 330 are prepared for the printer 300. Thus, the client terminal 100 can perform printing of print data on any of those four printers.

A logical printer means a virtual printer that is set to be referred to by an OS according to the print setting information. When plural logical printers having different setting values (for example, the number of copies, and the paper size) in the print setting information of the physical printer 300 are set, it appears to the OS of the client terminal 100 that the logical printers 310, 320, and 330 are virtually connected to the network 500.

Print data is transmitted from the client terminal 100 to the printer 300 through the network 500. The network 500 can be the Internet, a local area network (LAN), a wireless LAN, and the like.

The client terminal 100 is a general-purpose computer device with a communicating function, and issues a request for printing drawing data, such as documents, to a printer. FIG. 2 is a block diagram of a functional configuration of the client terminal 100. The client terminal 100 includes an application unit 110, a printer driver unit 120, a port monitor unit 130, and a communications unit 140.

The application unit 110 is software for generating and/or displaying drawing data. The application unit 110 is for example document creation software such as Microsoft Word (Registered Trademark), which is a product of Microsoft (Registered Trademark) Corporation. The application unit 110 transmits drawing data specified by a user to the printer driver unit 120. When print settings such as a paper size and a need for stapling are specified by the user, the application unit 110 also transmits data of the specified print settings (hereinafter, "print setting data") to the printer driver unit 120. When a name of the printer 300 or any of the logical printers 310 to 330 (for example, a logical printer name such as PR1 and PR2) is specified, the application unit 110 transmits the specified name of the printer to the printer driver unit 120.

The printer driver unit 120 is a dedicated printer driver for the printer 300, or the like, which receives the drawing data from the application unit 110 and converts the drawing data to print data that is data that can be printed on a printer connected to the client terminal 100. More specifically, the printer driver unit 120 converts the drawing data into page description language (PDL) data, and transmits the PDL data to the port monitor unit 130. Moreover, the printer driver unit 120 converts the print setting data received from the application unit 110 into printer job language (PJL) data, and transmits the PJL data to the port monitor unit 130. The printer driver unit 120 transmits the name of the logical printer received from the application unit 110 to the port monitor unit 130.

FIG. 3 is a schematic diagram for explaining an example of the PJL data. As shown in FIG. 3, various kinds of print setting information enclosed by a broken line, such as whether to sort the drawing data, the number of copies, and whether to perform duplex printing, in addition to the paper size and the need for stapling are described in the PJL data, in association with item names of the print setting information.

The port monitor unit 130 converts the PDL data and the PJL data into respective communication protocol data, and transmits both the pieces of the communication protocol data to the communications unit 140. Moreover, the port monitor unit 130 transmits the name of the logical printer received from the printer driver unit 120 to the communications unit 140.

The communications unit 140 transmits both the pieces of the communication protocol data and the name of the logical printer (hereinafter, these three pieces of data are collectively referred to "print data"), which are received from the port monitor unit 130, to the printer 300 through the network 500.

Figure 4:
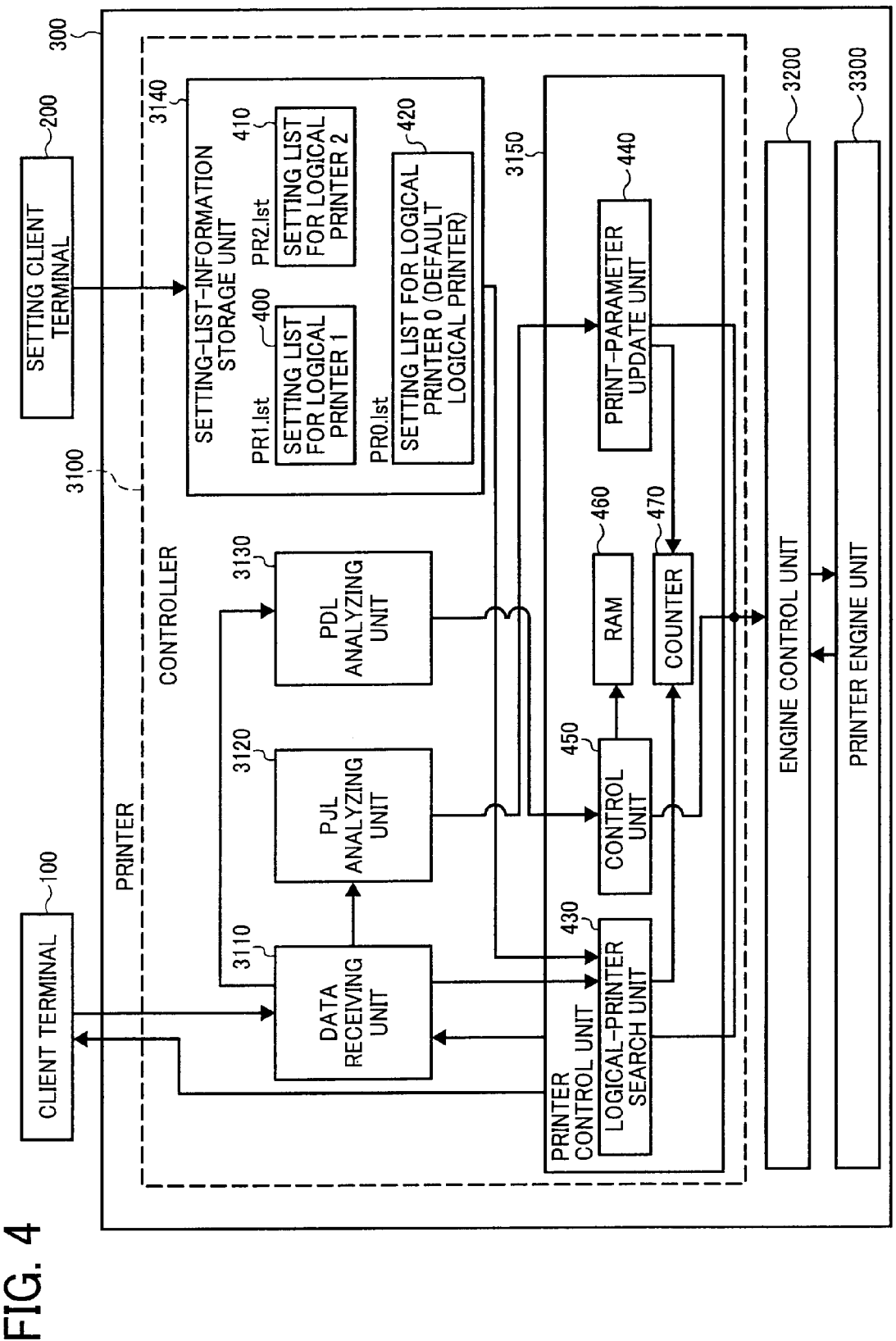
FIG. 4 is a block diagram of a configuration of a printer shown in FIG. 1.

Referring back to FIG. 1, the printer 300 prints the PDL data in response to a print request received from the client terminal 100. FIG. 4 is a block diagram of a functional configuration of the printer 300. The printer 300 includes a controller 3100, an engine control unit 3200, and a printer engine unit 3300.

The controller 3100 receives a print request from the client terminal 100 and instructs the engine control unit 3200 to print the PDL data. The controller 3100 includes a data receiving unit 3110, a PJL analyzing unit 3120, a PDL analyzing unit 3130, a setting-list-information storage unit 3140, and a printer control unit 3150.

The data receiving unit 3110 receives the print data from the client terminal 100 and notifies the PJL analyzing unit 3120 of reception of the print data. When a control unit 450 in the printer control unit 3150 resets print setting parameters, the data receiving unit 3110 notifies a logical-printer search unit 430 in the printer control unit 3150 of the name of the logical printer. When the logical-printer search unit 430 obtains a setting list of the logical printer, the data receiving unit 3110 transmits the PJL data to the PJL analyzing unit 3120. When a print-parameter update unit 440 in the printer control unit 3150 updates the print setting parameters, the data receiving unit 3110 transmits the PDL data to the PDL analyzing unit 3130.

Upon receiving the PJL data from the data receiving unit 3110, the PJL analyzing unit 3120 analyzes contents of the PJL data, obtains the setting values such as the number of copies, the paper size and the need for stapling, and the item names corresponding to the setting values, and transmits the obtained setting values and item names to the print-parameter update unit 440. Upon receiving the notification of reception of the print data from the data receiving unit 3110, the PJL analyzing unit 3120 issues a request for resetting the print setting parameters to the control unit 450.

Upon receiving the PDL data from the data receiving unit 3110, the PDL analyzing unit 3130 analyzes the PDL data to generate image data corresponding to a print drawing image. The PDL analyzing unit 3130 transmits the generated image data to the control unit 450.

The setting-list-information storage unit 3140 is a storage medium, such as a hard disk drive (HDD) or a memory, that stores therein settings on printing of the logical printer in association with the logical printer name, as a setting list. Specifically, the setting-list-information storage unit 3140 stores therein a setting list 400 for the logical printer 1, a setting list 410 for the logical printer 2, and a setting list 420 for the logical printer 0.

The setting list 400 for the logical printer 1, the setting list 410 for the logical printer 2, and the setting list 420 for the logical printer 0 contain settings on printing in list formats (these are hereinafter collectively referred to as "setting lists"). Names PR1.lst, PR2.lst, and PR0.lst are assigned to these setting lists, respectively. Character strings "PR1", "PR2", and "PR0" corresponding to the logical printer names are keys to be used for identifying the logical printers that receive a print request from the client terminal 100.

FIG. 5 is a schematic diagram for explaining detailed settings in the setting lists. As shown in FIG. 5, the setting values such as the number of copies, the paper size, and the need for stapling, and the item names associated with these setting values (for example, "QTY" for the number of copies, and "TRAY" for the size of the paper feed tray) corresponding to the logical printers are registers in the setting list 400 for the logical printer 1, the setting list 410 for the logical printer 2, and the setting list 420 for the logical printer 0, respectively.

As described below, the settings in the setting lists are input by a user with the help of the setting client terminal 200.

FIG. 5 depicts examples of the setting lists of three printers, i.e., the logical printer 0 (default logical printer), the logical printer 1, and the logical printer 2. The setting list of the default logical printer is set for the print setting parameters when a logical printer that prints the PDL data received from the client terminal 100 is not registered in the printer 300.

Referring back to FIG. 4, the printer control unit 3150 controls the controller 3100, and includes the logical-printer search unit 430, the print-parameter update unit 440, the control unit 450, a random access memory (RAM) 460, and a counter 470. As described below, the print setting parameters are previously stored in the RAM 460. The print setting parameters are obtained by converting the setting values in the setting lists of the logical printer and the item names corresponding to the setting values in parameter formats, so that the engine control unit 3200 can control the printer engine unit 3300 during printing.

The control unit 450 controls operations of the logical-printer search unit 430 and the print-parameter update unit 440. Upon receiving the image data from the PDL analyzing unit 3130, the control unit 450 instructs the engine control unit 3200 to ready to start printing the received image data. Then, the control unit 450 transmits the print setting parameters that are generated by the print-parameter update unit 440 by updating the setting values of the PJL data, and the image data received from the PDL analyzing unit 3130, to the engine control unit 3200. Upon receiving the request for resetting the print setting parameters from the PJL analyzing unit 3120, the control unit 450 resets the print setting parameters stored in the RAM 460.

The counter 470 is used by the logical-printer search unit 430 and the print-parameter update unit 440 to calculate the number of the setting lists and the number of the items in the setting list. With the counter 470, the number of the setting lists stored in the setting-list-information storage unit 3140 and the number of the items in the setting list are calculated.

Upon receiving the name of the logical printer from the data receiving unit 3110, the logical-printer search unit 430 searches for the setting list of the logical printer corresponding to the received logical printer name, among the plural setting lists of the logical printers stored in the setting-list-information storage unit 3140, and obtains the setting list.

More specifically, the logical-printer search unit 430 initially reads the notified logical printer name (PR1). The logical-printer search unit 430 then counts the setting lists stored in the setting-list-information storage unit 3140. The logical-printer search unit 430 uses the logical printer name (PR1) as a key. Accordingly, the logical-printer search unit 430 searches for the setting list corresponding to the logical printer name stored in association with the setting list, among the setting list 400 for the logical printer 1, the setting list 410 for the logical printer 2, and the setting list 420 for the logical printer 0 stored in the setting-list-information storage unit 3140, to obtain the setting list of the logical printer corresponding to the logical printer name.

If the logical printer name (PR1) is not included in the setting lists of the logical printers stored in the setting-list-information storage unit 3140 (that is, if the notified logical printer name does not coincide with any of the character strings of the logical printer names stored in the setting-list-information storage unit 3140), the logical-printer search unit 430 obtains the setting list of the logical printer 0, that is, the setting list of the default logical printer.

Upon receiving the setting values of the PJL data and the item names corresponding to the setting values from the PJL analyzing unit 3120, the print-parameter update unit 440 sets the setting values in the setting list obtained by the logical-printer search unit 430 as the print setting parameters, and updates the setting values of the print setting parameters with the setting values of the PJL data received from the PJL analyzing unit 3120.

More specifically, the print-parameter update unit 440 initially sets the setting values of the setting list obtained by the logical-printer search unit 430 as the parameters. The print-parameter update unit 440 then reads the item name corresponding to each of the setting values (for example, the item name (QTY) for the number of copies in the setting list 420 for the logical printer 0 in FIG. 5) from the items of the setting list, and determines whether the read item name (QTY) is included in the item names of the PJL data received from the PJL analyzing unit 3120. Upon determining that the item name (QTY) is included in the item names of the PJL data, the print-parameter update unit 440 obtains the setting value corresponding to the item name (for example, "1" in the case of the PJL data as shown in FIG. 3). The print-parameter update unit 440 determines whether the obtained setting value is equal to the setting value of the set parameter. Upon determining that both of the setting values are not equal, the print-parameter update unit 440 updates the setting value in the setting list (for example, the setting value "999" of the item name (QTY) for the number of copies in the setting list 420 for the logical printer 0 as shown in FIG. 5), which is set as the parameter, with the obtained setting value (for example, "1" in the case of the PJL data as shown in FIG. 3).

Upon determining that the item name read from the setting list is not included in the item names of the PJL data, or upon determining that the setting value obtained from the PJL data is equal to the setting value of the set parameter, the print-parameter update unit 440 directly uses the setting value set for the parameter, as the print setting parameter.

Upon receiving the instruction of standby to start printing image data, the image data, and the print setting parameters from the control unit 450, the engine control unit 3200 instructs the printer engine unit 3300 to start components of the printer engine unit 3300. Upon receiving a notification of completed printing of the image data from the printer engine unit 3300, the engine control unit 3200 notifies the control unit 450 of the completed printing.

Upon receiving the instruction for starting the components from the engine control unit 3200, the printer engine unit 3300 starts the component such as an exposure device (not shown) and a photosensitive drum (not shown), to print the image data. After completion of printing of the image data, the printer engine unit 3300 notifies the engine control unit 3200 of completion of printing.

Referring back to FIG. 1, the setting client terminal 200 is explained. The setting client terminal 200 is a general-purpose computer device used by the users to input, set, or delete the setting values in the setting list of the logical printer, or display a listing of the setting lists. As shown in FIG. 6, a user activates a screen for inputting setting values of the logical printer, and inputs the setting values such as the number of copies, the paper size, and the need for stapling. The setting values input in this way are transmitted to the printer 300 through the network 500. The printer 300 receives the setting values, and registers and stores the received setting values in the setting list for the logical printer of the setting-list-information storage unit 3140. While no block diagram of the setting client terminal 200 is given, the setting client terminal 200 can be any computer device including a web browser such as the Internet Explorer (I/E), and a communicating function.

Figure 7:
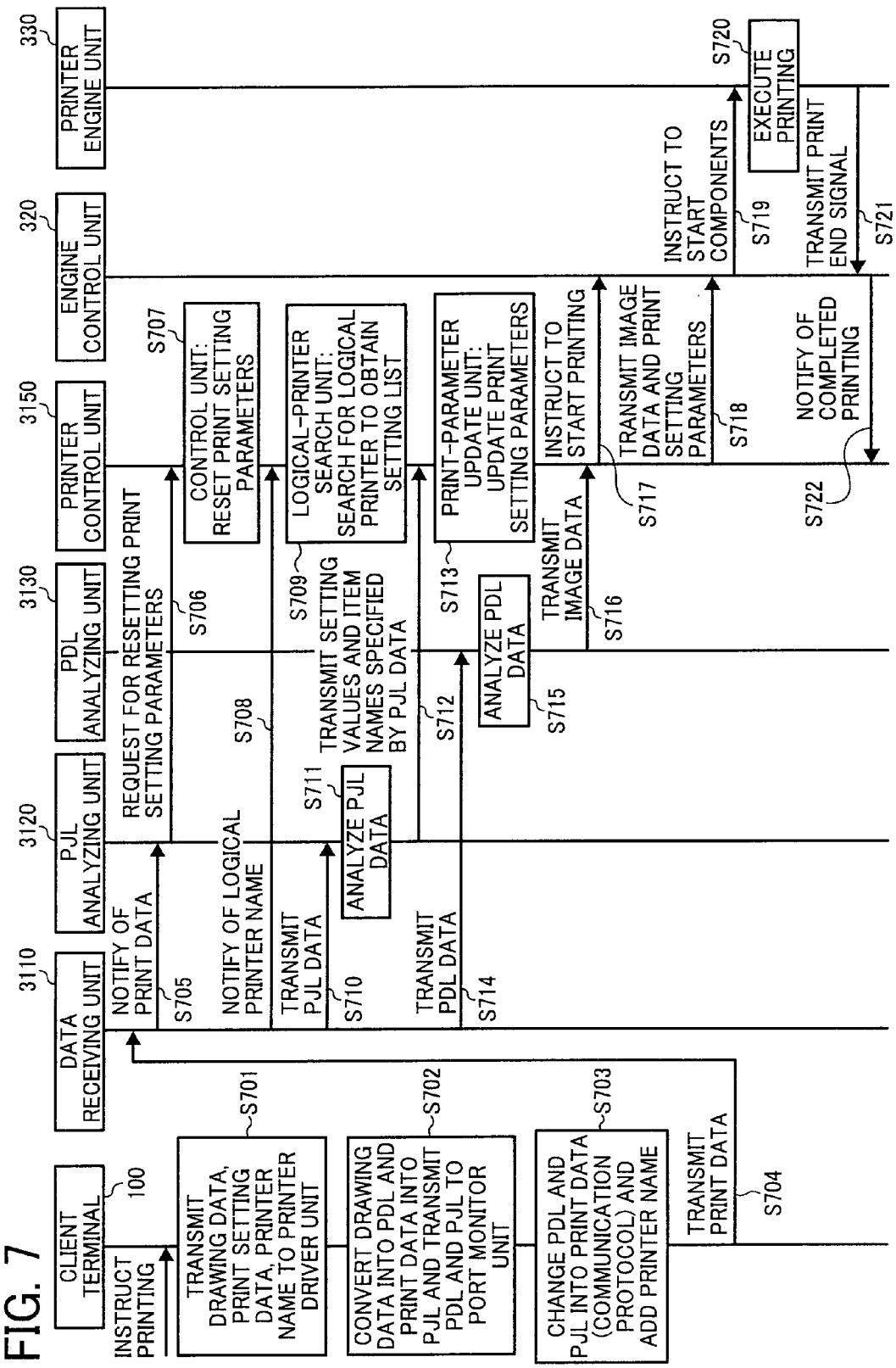
FIG. 7 is a sequence diagram of an execution procedure performed by the printer shown in FIG. 4 until drawing data is printed.

An execution process performed by the printer system 1000 is explained. FIG. 7 is a sequence diagram of an execution procedure performed when a user creates a document on the client terminal 100, and issues a print request to the logical printer 320 (logical printer 1).

As shown in FIG. 7, when the user issues a print request to print drawing data created by the application unit 110, the application unit 110 transmits the drawing data, print setting data, and the name (PR1) of the logical printer to the printer driver unit 120 (Step S701).

Upon receiving the drawing data and the print setting data from the application unit 110, the printer driver unit 120 converts the drawing data into PDL data, and the printer setting data into PJL data. The printer driver unit 120 transmits the PDL data, the PJL data, and the logical printer name (PR1) to the port monitor unit 130 (Step S702).

Upon receiving the PDL data and the PJL data from the printer driver unit 120, the port monitor unit 130 converts protocols of these two pieces of data to fit the communication protocol. The port monitor unit 130 transmits these two pieces of data and the logical printer name (PR1) to the communications unit 140 (Step S703).

The communications unit 140 then transmits the PDL data, the PJL data, and the logical printer name (PR1) (that is, print data), received from the port monitor unit 130, to the printer 300 (Step S704).

Upon receiving the print data from the client terminal 100, the data receiving unit 3110 notifies the PJL analyzing unit 3120 of reception of the print data (Step S705).

Upon receiving the notification of reception of the print data from the data receiving unit 3110, the PJL analyzing unit 3120 requests the control unit 450 to reset the print setting parameters (Step S706).

Upon receiving the request for resetting the print setting parameters from the PJL analyzing unit 3120, the control unit 450 resets the print setting parameters (Step S707).

Upon completion of resetting of the print setting parameters by the control unit 450, the data receiving unit 3110 notifies the logical-printer search unit 430 of the logical printer name (PR1) out of the print data (Step S708).

The logical-printer search unit 430 performs a process for searching for and obtaining a setting list, using the logical printer name received from the data receiving unit 3110 as a key (Step S709). This process is explained in detail with reference to FIG. 8.

Figure 8:
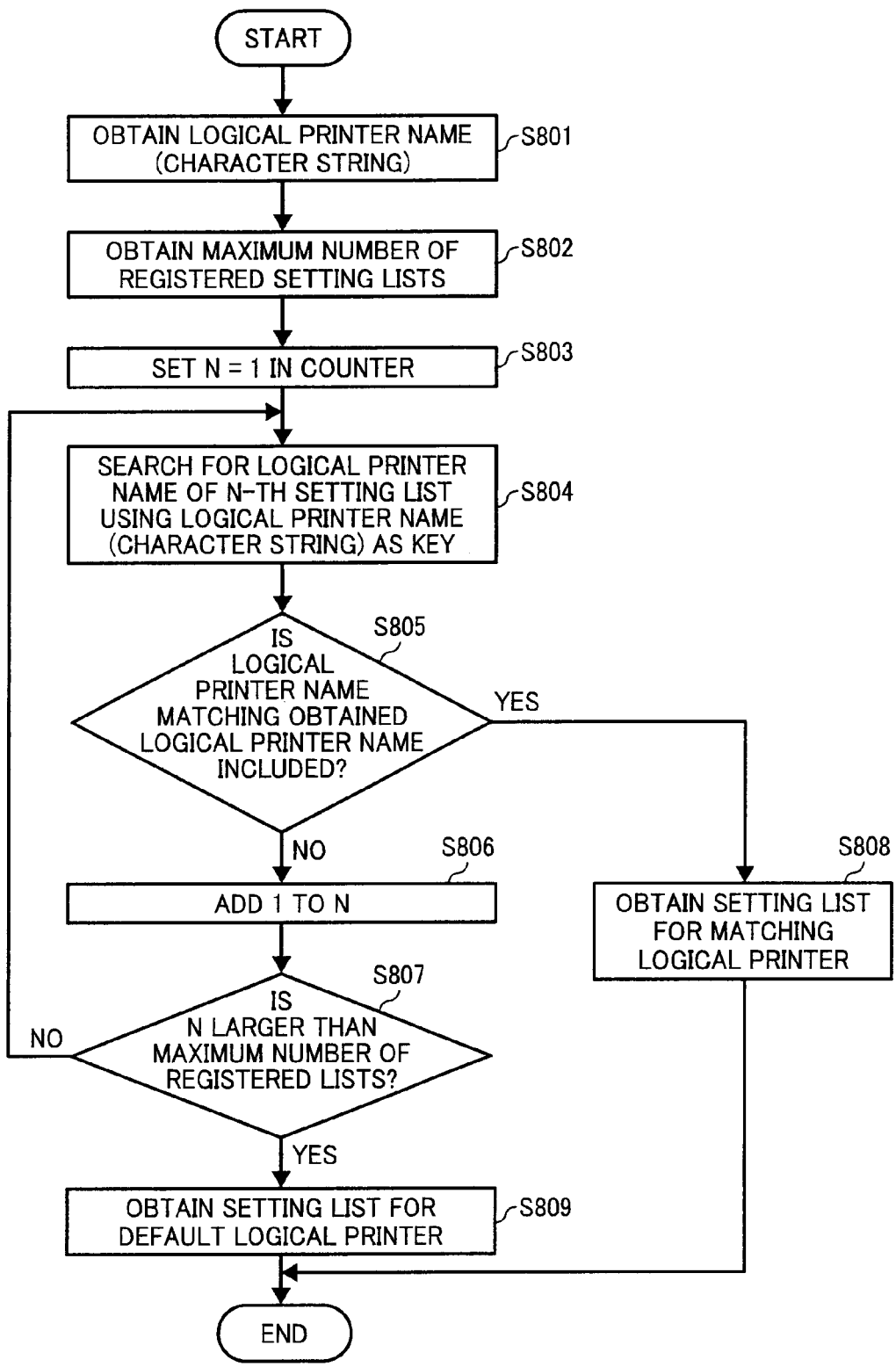
FIG. 8 is a sequence diagram of an execution procedure performed by the printer shown in FIG. 4 to search for a logical printer.

As shown in FIG. 8, first, the logical-printer search unit 430 reads the notified logical printer name (character string) (Step S801).

The logical-printer search unit 430 then counts the setting lists stored in the setting-list-information storage unit 3140, to obtain a maximum number thereof (Step S802). The logical-printer search unit 430 sets an initial value "1" in the counter 470 (Step S803).

Next, the logical-printer search unit 430 uses the logical printer name (character string) read at Step S801 as a key, to search for the logical printer name stored in association with the setting list (Step S804).

The logical-printer search unit 430 then determines whether a logical printer name matching the read name (character string) of the logical printer is included (Step S805). Upon determining that the matching logical printer name is included (YES at Step S805), the logical-printer search unit 430 obtains the setting list stored in association with the logical printer name (Step S808). More specifically, when the matching logical printer name is "PR1", the logical-printer search unit 430 obtains the setting list 400 for the logical printer 1 stored in the setting-list-information storage unit 3140.

Meanwhile, upon determining whether a logical printer name matching the read name (character string) of the logical printer is included (Step S805) and determining that no logical printer name matches the read name (NO at Step S805), the logical-printer search unit 430 increments the value N of the counter 470 by one (Step S806).

Further, the logical-printer search unit 430 determines whether the current value N of the counter 470 is larger than the maximum number of the setting lists counted at Step S802 (Step S807).

Upon determining that the current value N of the counter 470 is larger than the maximum number of the setting lists (YES at Step S807), the logical-printer search unit 430 obtains the setting list 420 for the logical printer 0 (the setting list for the default logical printer) (Step S809). More specifically, when no setting list of the logical printer name matching the read logical printer name is stored in the setting-list-information storage unit 3140, the setting list for the default logical printer is used.

Upon determining that the current value N of the counter 470 is equal to or smaller than the maximum number of the setting lists (NO at Step S807), the system control is returned to Step S804, and the processes at Steps S804 to S808 or S809 is repeated.

According to the processes at Steps S801 to 809, either the setting list for the default logical printer or the setting list for the logical printer matching the logical printer name specified by the client terminal 100 can be obtained.

Referring back to FIG. 7, when the logical-printer search unit 430 obtains the setting list, the data receiving unit 3110 transmits the PJL data to the PJL analyzing unit 3120 (Step S710).

The PJL analyzing unit 3120 analyzes contents of the PJL data received from the data receiving unit 3110 to obtain the setting values such as the number of copies, the paper size, and the need for stapling, and the item names corresponding to the setting values (Step S711). The PJL analyzing unit 3120 transmits the obtained setting values and item names corresponding to the setting values to the print-parameter update unit 440 (Step S712).

Figure 9:
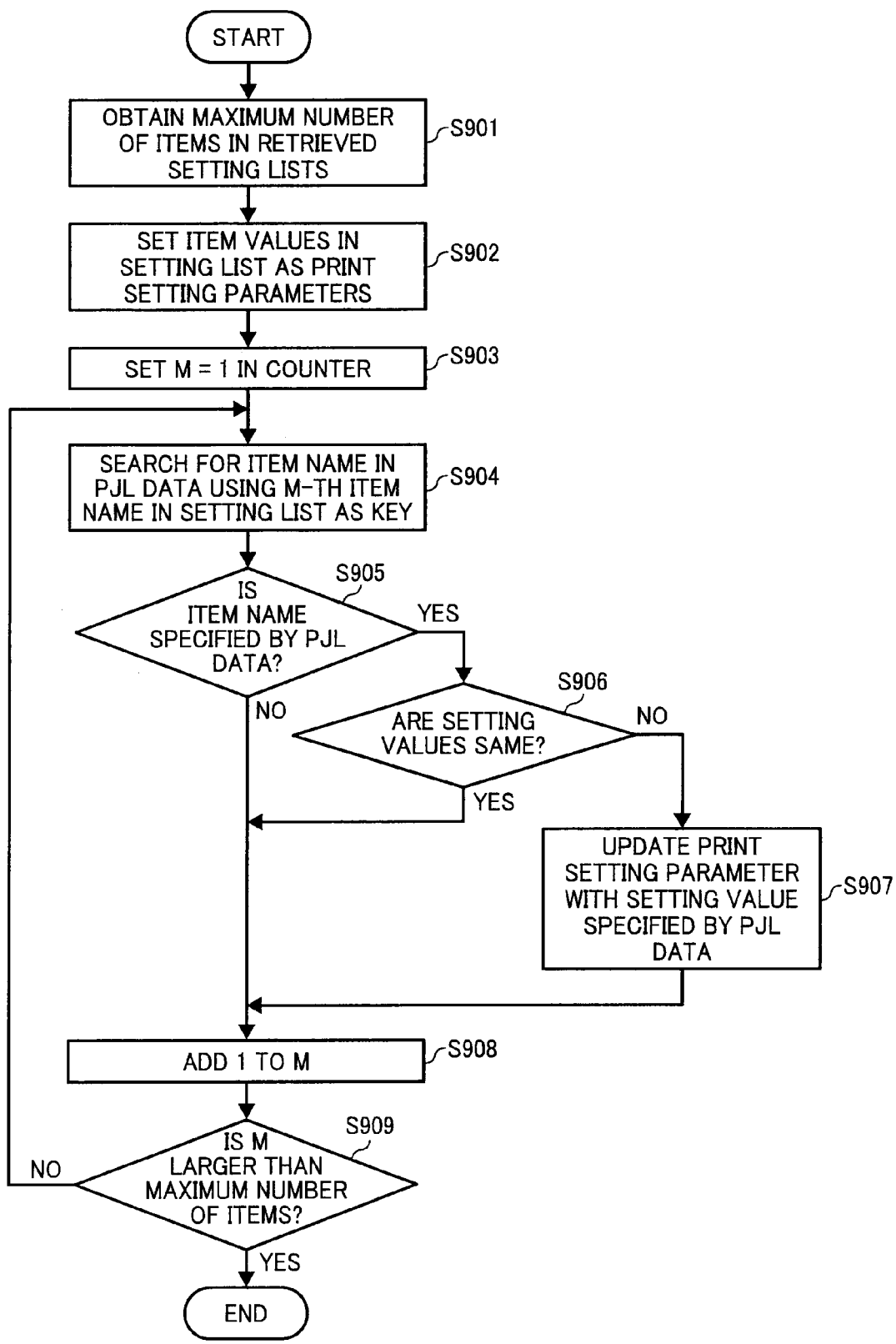
FIG. 9 is a sequence diagram of an execution procedure performed by the printer shown in FIG. 4 to update print setting parameters.

Upon receiving the setting values and the item names corresponding to the setting values from the PJL analyzing unit 3120, the print-parameter update unit 440 performs a process for updating the setting values in the setting list with the received setting values (Step S713). The process is specifically explained with reference to FIG. 9.

Upon receiving the setting values and the corresponding item names of the PJL data from the PJL analyzing unit 3120, the print-parameter update unit 440 counts the items in the setting list obtained at Step S808 or S809 to obtain a maximum number thereof (Step S901).

The print-parameter update unit 440 sets the respective setting values of the items in the setting list obtained at Step S808 or S809 as the print setting parameters (Step S902), and sets "1" as the current value M of the counter 470 (Step S903).

The print-parameter update unit 440 uses one of the item names in the setting list as a key, to search for the item name in the item names received from the PJL analyzing unit 3120 (Step S904). The print-parameter update unit 440 determines whether the item name is specified by the PJL data (Step S905).

Upon determining that the item name in the setting list is specified by the PJL data (YES at Step S905), the print-parameter update unit 440 further determines whether the setting value of the print setting parameter and the setting value specified by the PJL data are the same (Step S906).

If the setting values are not the same (NO at Step S906), the print-parameter update unit 440 updates the setting value of the print setting parameter with the setting value corresponding to the item name received from the PJL analyzing unit 3120 (Step S907).

Meanwhile, upon determining that the item name in the setting list is not specified by the PJL data (NO at Step S905), or upon determining that the item name in the setting list is specified by the PJL data (YES at Step S905) and determining that the setting values are the same (YES at Step S906), the print-parameter update unit 440 performs nothing and the system control proceeds to the next step.

Upon completion of any process among the processes at Steps S905 to S907, the print-parameter update unit 440 increments the current value M of the counter 470 by one (Step S908), and determines whether the current value M of the counter 470 is larger than the maximum number of the items in the setting list, counted at Step S901 (Step S909).

Upon determining that the current value M of the counter 470 is larger than the maximum number of the items (YES at Step S909), the print-parameter update unit 440 terminates the process of updating the print setting parameters.

Meanwhile, if the current value M of the counter 470 is equal to or smaller than the maximum number of the items (NO at Step S909), the system control is returned to Step S904 and the processes at Steps S904 to S909 is repeated.

According to the processes at Steps S901 to S909, the setting values of the print setting parameters can be updated with the setting values of the PJL data specified by the user.

Referring back to FIG. 7, upon completion of the update of the print setting parameters, the data receiving unit 3110 transmits the PDL data to the PDL analyzing unit 3130 (Step S714).

The PDL analyzing unit 3130 analyzes contents of the PDL data received from the data receiving unit 3110 to generate image data corresponding to a print drawing image (Step S715), and transmits the generated image data to the control unit 450 (Step S716).

The control unit 450 instructs the engine control unit 3200 to be ready to start printing the image data (Step S717). The control unit 450 transmits the print setting parameters updated at Step S713 and the image data received from the PDL analyzing unit 3130 at Step S716, to the engine control unit 3200 (Step S718).

The engine control unit 3200 issues an instruction to start components such as an exposure device, a photosensitive drum, and an intermediate transfer belt of the printer engine unit 3300 (Step S719). The components of the printer engine unit 3300 print the image data according to the instruction (Step S720).

Upon completion of the printing of the image data, the printer engine unit 3300 transmits a print end signal to the engine control unit 3200 (Step S721). Upon receiving the print end signal, the engine control unit 3200 notifies the control unit 450 of completed printing of the image data (Step S722), which terminates all the processes according to the first embodiment.

According to the first embodiment, the drawing data specified by the user and the settings on printing in the print setting data are analyzed, and the settings in the previously stored setting list and the analyzed settings on the printing are compared. When both do not coincide, the analyzed settings on the printing are reflected on the print parameters, to print the drawing data. Accordingly, without a printer server, the data can be printed easily and quickly by the logical printer through the client terminal, by reflecting the print setting information specified by the user. Further, because no printer server is provided, personnel and material costs can be reduced.

According to the first embodiment, the settings on the printing included in the received print setting data and the settings in the setting list that is stored in the setting-list-information storage unit 3140 and corresponds to the received logical printer name are compared. When some setting is not specified in the settings on the printing, the setting in the setting list is reflected on the print parameters, to print the drawing data. Accordingly, without a printer server, the data can be printed more easily, quickly, and finely by the logical printer through the client terminal, by reflecting the print setting information specified by the user. Further, because no printer server is provided, personnel and material costs can be reduced.

According to the first embodiment, predetermined print setting information is stored as the default setting list. When no printer name matching the logical printer name specified by the user is included in the logical printer names corresponding to plural setting lists stored in the setting-list-information storage unit 3140, the settings in the default setting list are reflected on the print parameters, to print the drawing data. Accordingly, without a printer server, the data can be printed easily, quickly, and efficiently by the logical printer through the client terminal, by reflecting the print setting information specified by the user. Further, because no printer server is provided, personnel and material costs can be reduced.

According to the first embodiment, when the setting values that are specified by the PJL data transmitted from the client terminal 100 do not coincide with the setting values in the setting list stored in the setting-list-information storage unit 3140, the setting values specified by the PJL data are always set as the print setting parameters. However, some values that are not so important for printing of image data are included in the setting values specified by the PJL data. Thus, an example in which degrees of importance of the setting values specified by the PJL data are determined, and the print setting parameters are updated according to the degrees of importance is explained.

Figure 10:
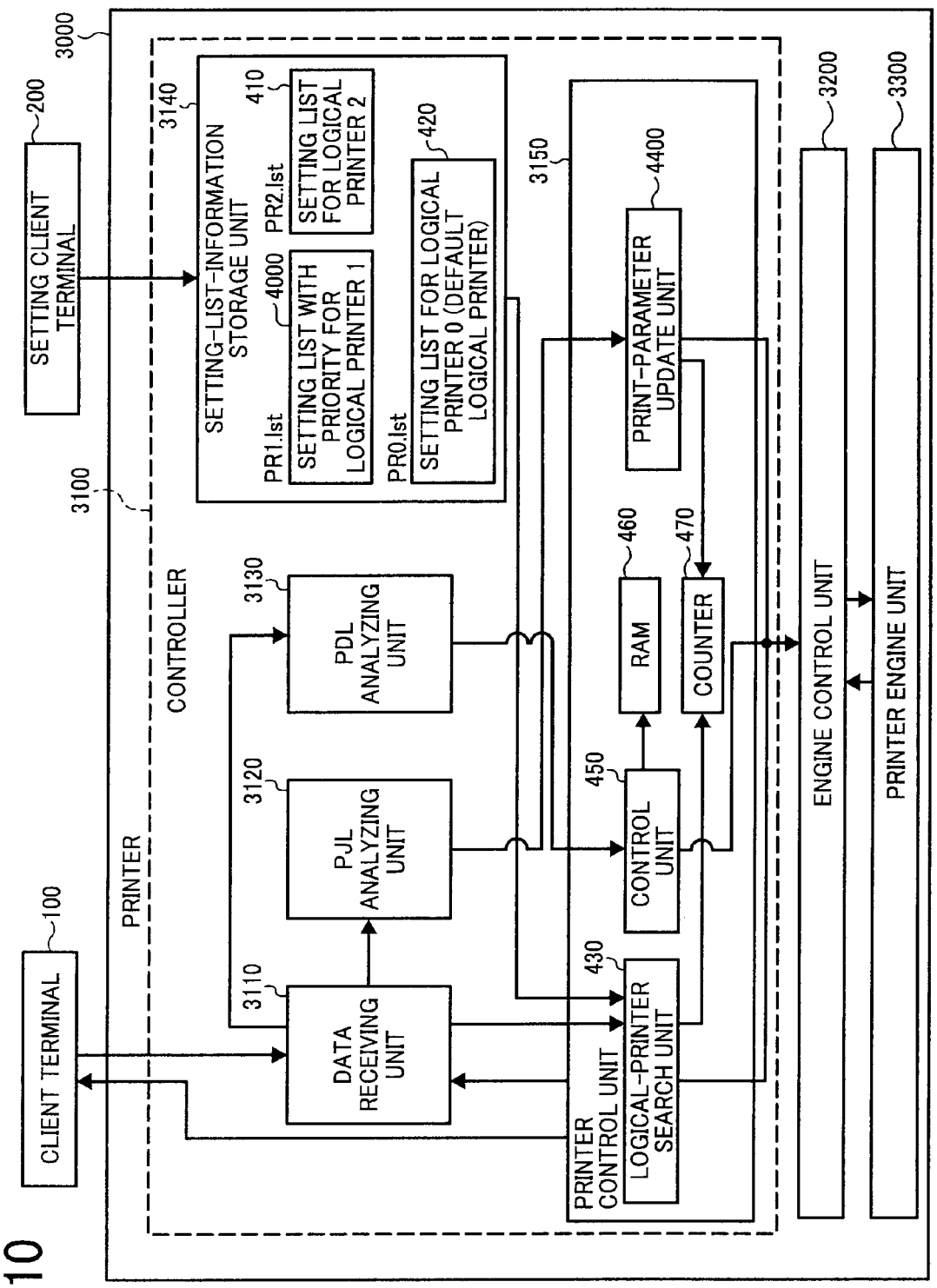
FIG. 10 is a block diagram of a configuration of a printer according to a second embodiment of the present invention.

FIG. 10 is a block diagram of a configuration of a printer 3000 according to a second embodiment of the present invention. The printer 3000 according to the second embodiment is different from that of the first embodiment in that a setting list 4000 with priority for the logical printer 1 is used as a setting list for the logical printer 1, and in a function of a print-parameter update unit 4400. In explanations below, like components as those in the first embodiment are denoted by like components, and explanations thereof will be omitted.

The printer 3000 according to the second embodiment is the same as the printer 300 according to the first embodiment in that it prints PDL data according to a print request from the client terminal 100. The printer 3000 is different in that the setting values of the print setting parameters are not updated with the setting values specified by the PJL data when priorities of setting items in the setting list 4000 with priority for the logical printer 1 are referred to and the priorities are low.

FIG. 11 is an example of the setting list 4000 with priority for the logical printer 1. As shown in FIG. 11, the priorities are stored in association with the setting items in the setting list 4000 with priority for the logical printer 1. The smaller the values of the priorities are, the higher the priorities are. The RAM 460 previously stores a threshold of the priority. As described below, when a value of the priority of a setting item is larger than the threshold (that is, when the priority is low), the setting value of the print setting parameter is not updated with the setting value specified by the PJL data.

Upon receiving the setting values of the PJL data and the item names corresponding to the setting values from the PJL analyzing unit 3120, the print-parameter update unit 4400 sets each of the setting values in the setting list obtained by the logical-printer search unit 430 as the print setting parameter. The print-parameter update unit 4400 refers to the priority corresponding to the setting value and the threshold, and determines whether the setting value of the set print setting parameter is updated with the setting value of the PJL data received from the PJL analyzing unit 3120. When the value of the priority is equal to or smaller than the threshold (that is, when the priority is high), the print-parameter update unit 4400 updates the setting value of the print setting parameter with the setting value of the PJL data.

Figure 13:
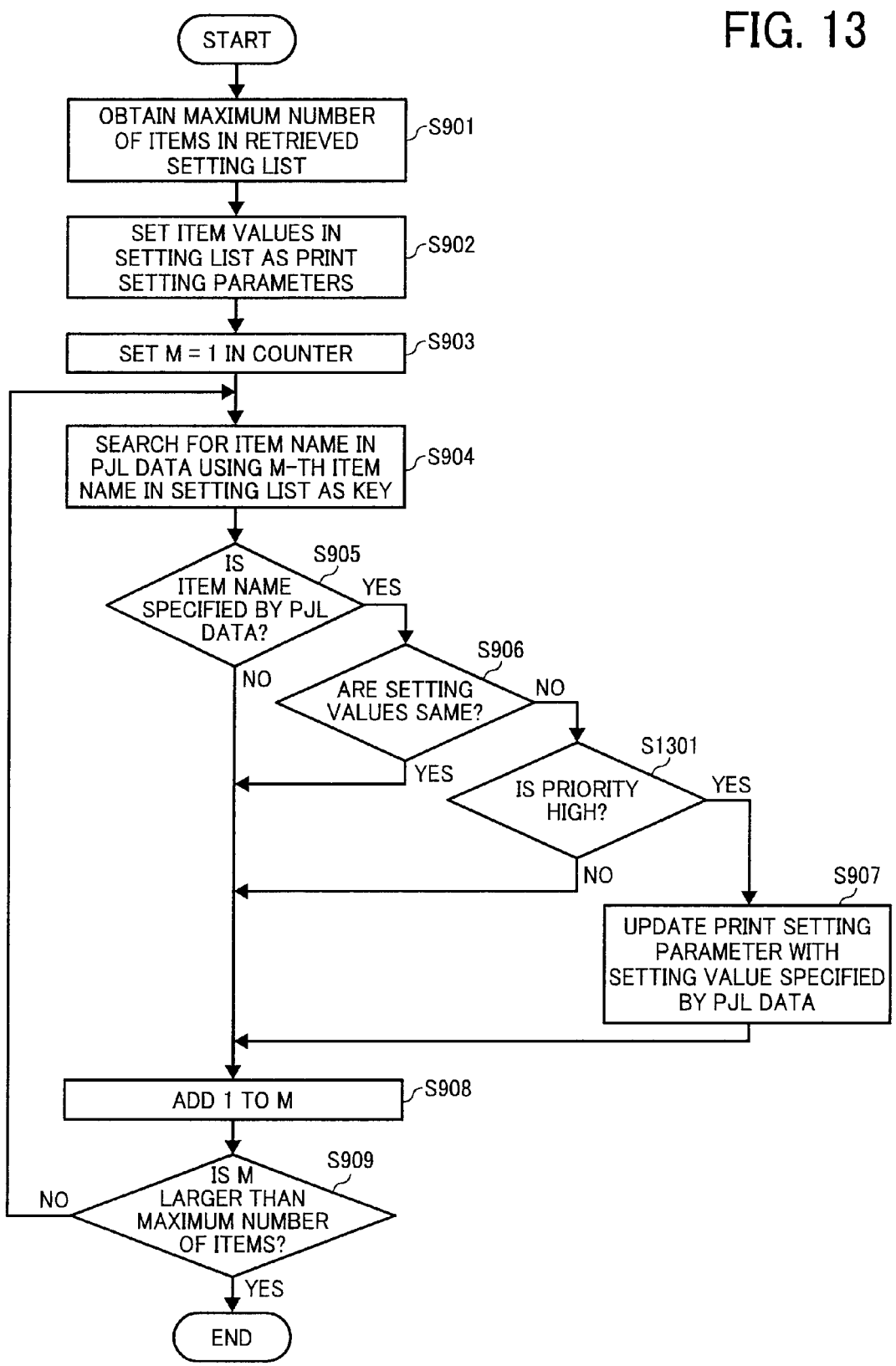
FIG. 13 is a sequence diagram of a process procedure of updating print setting parameters in the printer shown in FIG. 10.

An execution process performed by the printer system 1000 according to the second embodiment is explained next. The printer 3000 according to the second embodiment is different from the printer 300 according to the first embodiment only in the process of updating the print setting parameters with referring to the priorities. A process procedure of updating the print setting parameters with referring to the priorities is explained in detail, with reference to FIG. 13. Processes other than the process of updating the print setting parameters with referring to the priorities are the same as those according to the first embodiment. Therefore, the same processes (Steps S901 to S906, and S907 to S909) as those according to the first embodiment are denoted by like reference symbols, and explanations thereof will be omitted. According to the second embodiment, the RAM 460 stores "8" as the threshold. The setting values of the items are described in the PJL data, as shown in FIG. 12. Particularly, "RIGHTTOP" (top right) is specified as a setting value for a position of stapling (STAPLE), and "TOP" is specified as a setting value for a position of punching (PUNCH).

Upon determining that the item name in the setting list is specified by the PJL data (YES at Step S905), and determining that the setting value of the print setting parameter and the setting value specified by the PJL data are not the same (NO at Step S906), the print-parameter update unit 4400 refers to the priority corresponding to the item name, and determines whether the value of the priority is equal to or smaller than the threshold (that is, the priority is high) (Step S1301).

Upon determining that the priority is high (YES at Step S1301), the print-parameter update unit 4400 updates the setting value of the print setting parameter with the setting value specified by the PJL data (Step S907).

On the other hand, upon determining that the value of the priority is larger than the threshold (that is, the priority is low) (NO at Step S1301), the print-parameter update unit 4400 proceeds the next Step to increment the current value M of the counter 470 by one, and repeats the processes at Steps S904 to S909. According to the second embodiment, because the threshold is set at "8", the print setting parameters are generated without updating the setting values of the items "STAPLE" and "PUNCH", having values larger than the threshold in the setting list as shown in FIG. 11, with the setting values "RIGHTTOP" of the "STAPLE" and "TOP" of "PUNCH" specified by the PJL data as shown in FIG. 12.

According to the second embodiment, the priorities indicating the ranks, set as the print setting parameters in association with plural pieces of print setting information are stored. The setting on printing included in the received print setting data and the setting in the setting list stored in the setting-list-information storage unit 3140 and corresponding to the received logical printer name are compared. When both settings do not coincide, and when the priority is lower than a predetermined threshold, the setting in the setting list stored in the setting-list-information storage unit 3140 is reflected on the print parameter, to print the drawing data. Accordingly, without a printer server, the data can be printed easily, quickly, and efficiently by the logical printer through the client terminal. Further, because no printer server is provided, personnel and material costs can be reduced.

According to the first or second embodiment, the drawing data is converted into the PDL data, and the print setting data for the drawing data is converted into the PJL data. Thus, the PDL data is printed by a logical printer according to the print setting described in the PJL data. However, the present invention is not limited to this case, and can be applied to any case that the drawing data is printed by a logical printer according to the print setting information specified by the user.

An image forming program that is executed by the printer according to the first or second embodiment is installed beforehand in a read only memory (ROM) or the like.

The image forming program executed by the printer according to the first or second embodiment can be recorded in a computer-readable recording medium such as a compact disk read only memory (CD-ROM), a flexible disk (FD), a compact disk recordable (CD-R), and a digital versatile disk (DVD), as a file of an installable or executable format.

Further, the image forming program executed by the printer according to the first or second embodiment can be stored in a computer that is connected to a network such as the Internet, and downloaded through the network. The image forming program executed by the physical printer according to the first or second embodiment can be provided or distributed through a network such as the Internet.

The image forming program executed by the printer according to the first or second embodiment has a module configuration including the components as mentioned above (the data receiving unit, the PJL analyzing unit, the PDL analyzing unit, the printer control unit, the control unit the engine control unit, the printer engine unit, the logical-printer search unit, and the printer-parameter update unit). As actual hardware, the components above mentioned are loaded in a main memory by the CPU (processor) reading the image forming program from the ROM and executing the program. Accordingly, the data receiving unit, the PJL analyzing unit, the PDL analyzing unit, the printer control unit, the control unit, the engine control unit, the printer engine unit, the logical-printer search unit, and the print-parameter update unit are generated in the main memory.

According to an aspect of the present invention, the image forming apparatus analyzes drawing data to be printed and settings on printing in print setting data, specified by the user. The image forming apparatus compares settings on printing in print setting information previously stored and the analyzed settings on the printing, and prints the drawing data by reflecting the analyzed settings on the printing on print parameters. Therefore, the data can be printed easily and quickly by a logical printer through a client terminal. Further, because no printer server is installed, personnel and material costs can be reduced.

According to another aspect of the present invention, the image forming apparatus compares the settings on printing included in the received print setting data and settings in the print setting information stored in the setting-information storage unit and corresponding to received setting identification information. Even when no setting is provided by the received print setting data, the image forming apparatus reflects the settings in the print setting information on the print parameters, thereby printing the drawing data. Therefore, the data can be printed easily, quickly, and finely by a logical printer through the client terminal. Further, because no printer server is installed, personnel and material costs can be reduced.

According to still another aspect of the present invention, the image forming apparatus stores predetermined print setting information as print setting information on omission. When setting identification information matching the setting identification information specified by the user is not included in the setting identification information corresponding to the pieces of the print setting information stored in the setting-information storage unit, the setting in the print setting information on omission is reflected on the print parameter, thereby printing the drawing data. Therefore, the data can be printed easily and quickly by a logical printer through the client terminal without bothering the user. Further, because no printer server is installed, personnel and material costs can be reduced.

According to still another aspect of the present invention, the image forming apparatus stores priorities indicating ranks that are set as the print parameters in association with the pieces of the print setting information. The image forming apparatus compares the settings on the printing included in the received print setting data and the settings in the print setting information stored in the setting-information storage unit and corresponding to the received setting identification information. The image forming apparatus reflects the settings in the print setting information stored in the setting-information storage unit on the print parameters, thereby printing the drawing data. Accordingly, the data can be printed easily, quickly, and efficiently by a logical printer through the client terminal. Further, because no printer server is installed, personnel and material costs can be reduced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
a setting-information storage unit that stores therein plural pieces of first print setting information each indicating a list of settings on printing in association with first setting identification information specific to the first print setting information;
a data receiving unit that receives second print setting data including settings on printing, specified by a user through an information processing terminal that is connected to a network, print drawing data including drawing data to be printed, and second setting identification information, as a print request;
a parameter setting unit that compares the settings included in the print setting data and settings included in third print setting information that is the first print setting information that corresponds to the second setting identification information, and when the both settings do not coincide, specifies the settings included in the print setting data as print parameters; and
a printing unit that prints the print drawing data using the print parameters,
wherein:
the setting-information storage unit stores therein the pieces of the first print setting information and priorities indicating ranks that are set as the print parameter, in association with the first print setting information,
the parameter setting unit compares the setting included in the print setting data and the setting included in the third print setting information, and when the both settings do not coincide and when the priority is lower than a predetermined threshold, specifies the setting included in the first print setting information as the print parameter, and
the settings included in the first print setting information correspond to at least one of a number of copies, a feed tray, a media type, duplexing, an output bin, stapling, job offset, and toner savings.

2. The image forming apparatus according to claim 1, wherein the parameter setting unit compares the settings included in the print setting data and the settings included in the third print setting information, and when some setting is not specified in the settings included in the print setting data, specifies the setting included in the first print setting information as the print parameter.

3. The image forming apparatus according to claim 1, further including:
a setting-information search unit that search for third setting identification information matching with the second setting identification information from the first setting identification information corresponding to the pieces of the first print setting information, wherein
the parameter setting unit compares the setting included in the print setting data and the setting included in the third print setting information corresponding, and when the both settings do not coincide, specifies the setting included in the print setting data as the print parameter, or when some setting is not specified in the settings included in the print setting data, specifies the setting included in the third print setting information as the print parameter.

4. The image forming apparatus according to claim 3, wherein
the setting-information storage unit stores therein predetermined print setting information among the pieces of the first print setting information as print setting information on omission,
the setting-information search unit obtains the first print setting information on omission when the third setting identification information matching with the second setting identification information is not included in the first setting identification information, and
the parameter setting unit specifies settings included in obtained print setting information on omission as the print parameters.

* * * * *